July 13, 1965
F. D. WERNER ETAL
3,195,028
CAPACITANCE PRESSURE GAGE
Filed Feb. 13, 1961
4 Sheets-Sheet 1
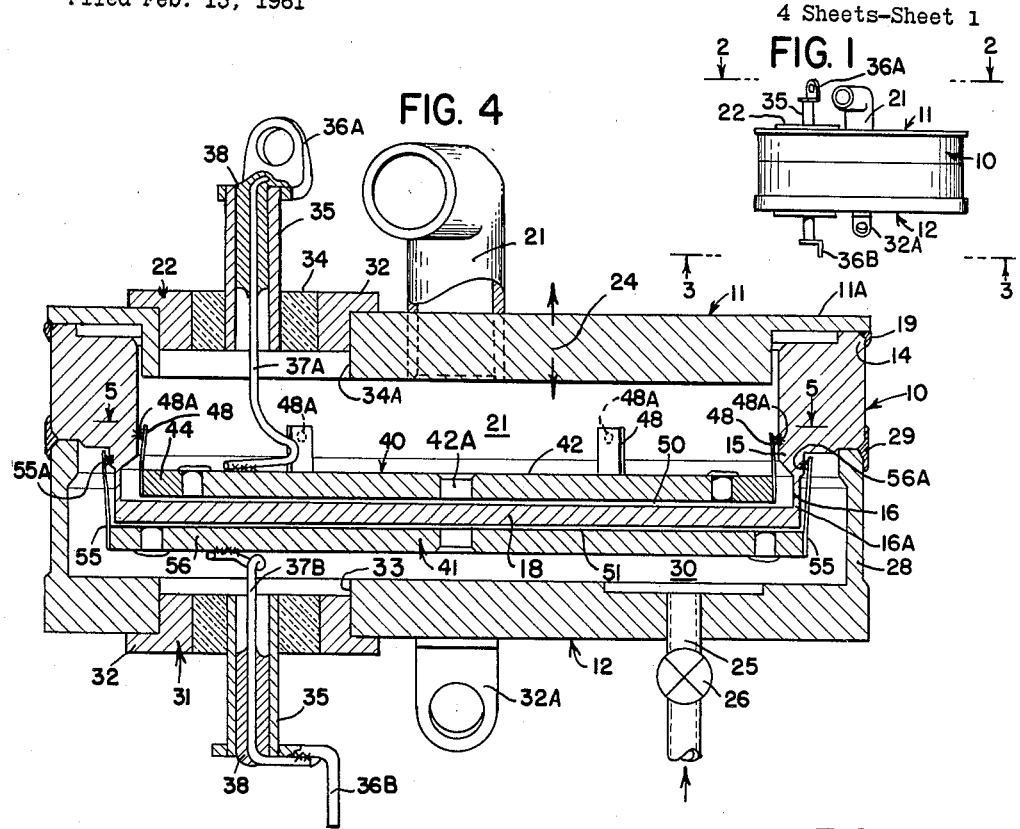
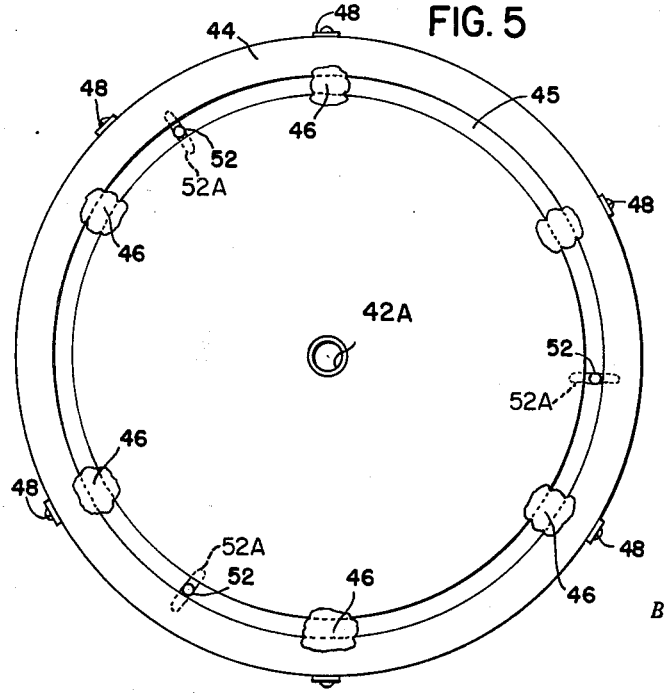
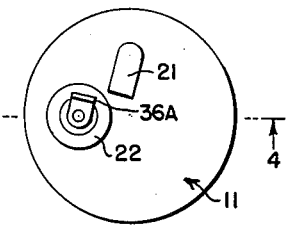
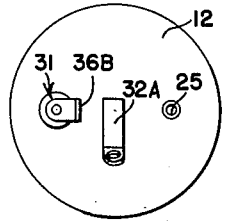
INVENTORS
FRANK D. WERNER
ROBERT L. GERONIME
BY Dugger & Johnson
ATTORNEYS

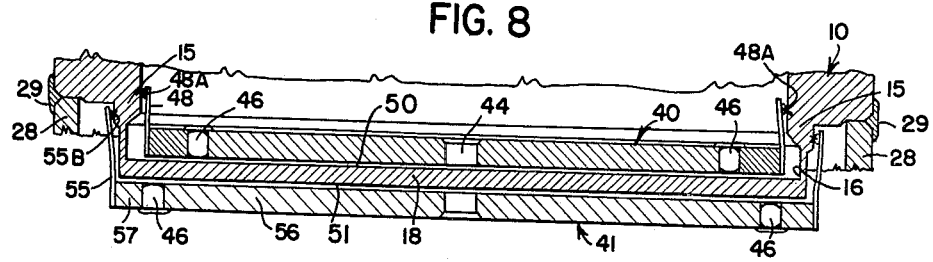
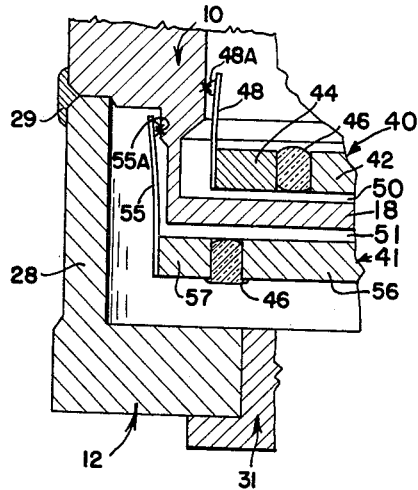
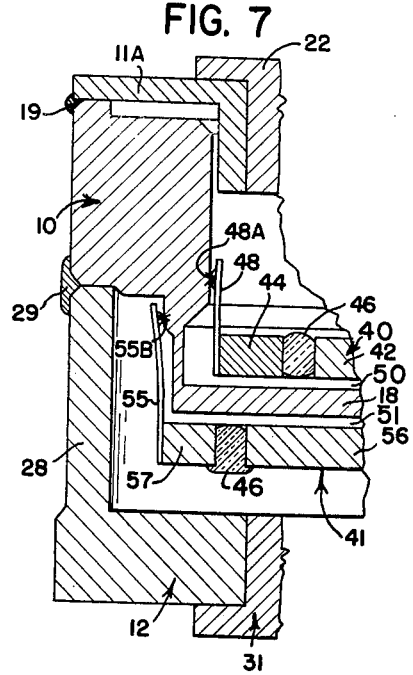

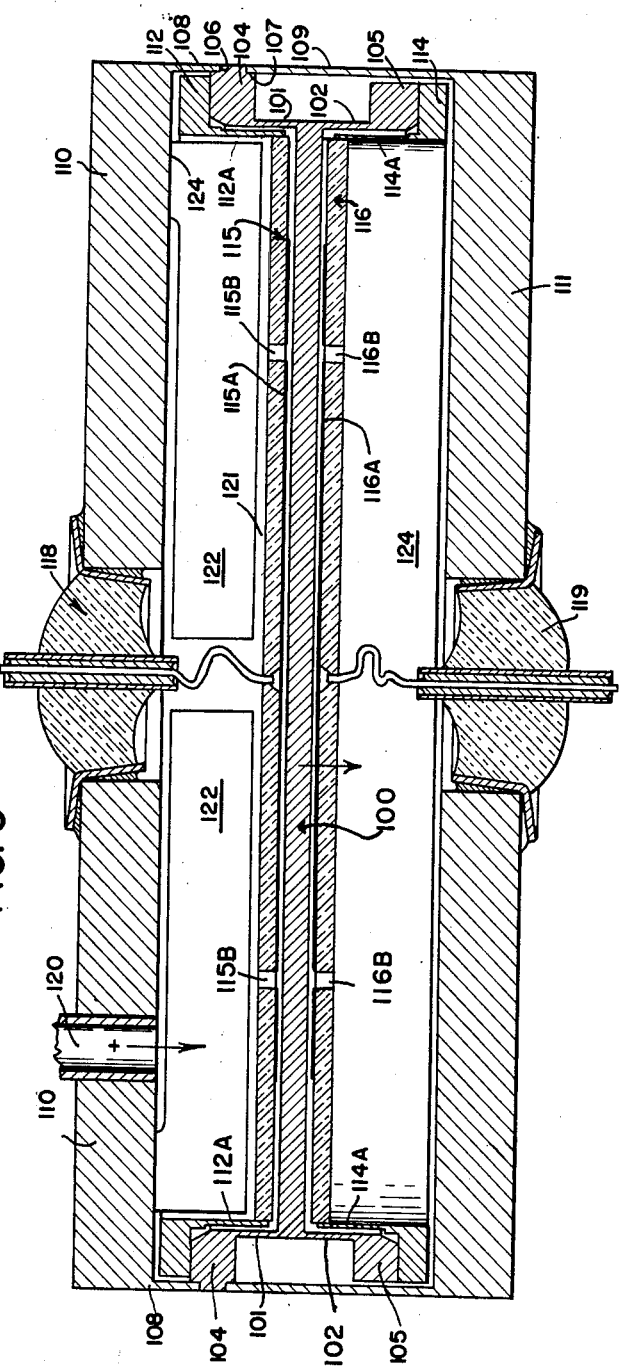

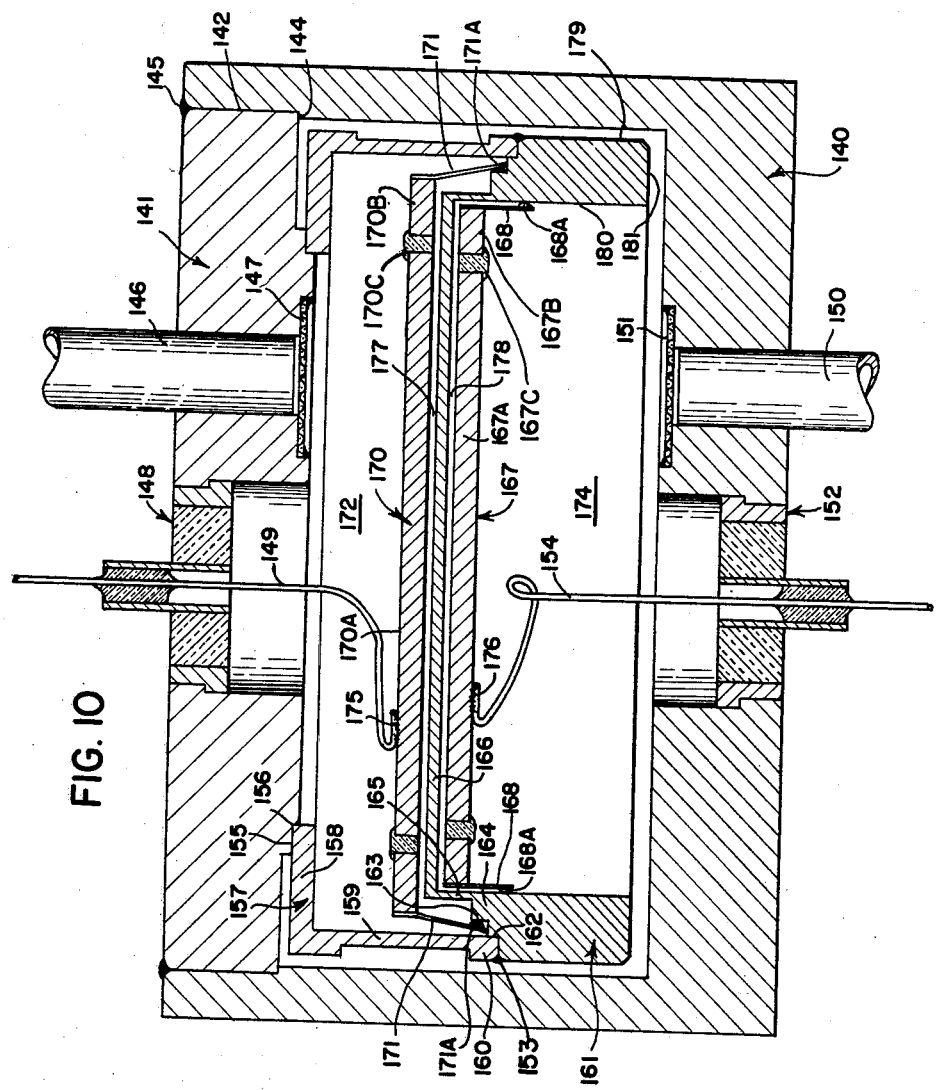

United States Patent Office 3,195,028
Patented July 13, 1965

3,195,028
CAPACITANCE PRESSURE GAGE
Frank D. Werner, Minneapolis, and Robert L. Geronime, Rosemount, Minn., assignors to Rosemount Engineering Company, Minneapolis, Minn., a corporation of Minnesota
Filed Feb. 13, 1961, Ser. No. 89,027
12 Claims. (Cl. 317—246)

This invention relates to capacitance pressure gage element, more particularly to a pressure transducer capable of providing a signal output in the form of electrical capacitance change which can be sensed by suitable circuit equipment.

It is an object of the invention to provide improved capacitance pressure gage. It is another object of the invention to provide a capacitance pressure gage element capable of providing a substantially linear output signal of capacitance change with respect to pressure change. It is another object of the invention to provide a capacitance pressure gage element which is relatively free from error in output signal due to stresses induced in the gage by the pressure changes being measured. It is a further object of the invention to provide an improved capacitance pressure gage element which is relatively free from signal errors due to acceleration forces. It is another object of the invention to provide an improved pressure gage element wherein error due to temperature change is minimized. It is another object of the invention to provide an improved capacitance pressure gage of the double capacitance type.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein FIGURE 1 is a side elevational view of an illustrative embodiment of the invention.

FIGURE 2 is an end elevational view taken in the direction of arrows 2—2 of FIGURE 1.

FIGURE 3 is another end elevational view in the opposite direction, as compared to that shown in FIGURE 2, and which is taken in the direction of arrows 3—3 of FIGURE 1.

FIGURE 4 is an enlarged longitudinal sectional view of the apparatus shown in FIGURES 1-3. The section as shown in FIGURE 4 is taken along the line and in the direction of arrows 4—4 of FIGURE 2.

FIGURE 5 is a separated-plane view of one of the capacitor plate elements. This view shows the upper surface of the plate element as it would appear if separated from the remainder of the device, and viewed in the direction of arrows 5—5 of FIGURE 4.

FIGURE 6 is an enlarged fragmentary sectional view corresponding to portions of FIGURE 4.

FIGURE 7 is another enlarged fragmentary sectional view of additional portions of FIGURE 4.

FIGURE 8 is a fragmentary enlarged transverse sectional view of a portion of the apparatus shown in FIGURE 4.

FIGURES 9 and 10 are transverse sectional views of additional embodiments of the invention.

Throughout the drawings, corresponding numerals refer to the same parts.

Referring to FIGURES 1-7, the capacitance pressure gage capsule comprises a ring frame element generally designated 10, which in respect to other portions of the apparatus is relatively massive and stronger. The pressure capsule includes ring 10 and an end plate closure generally designated 11 which is attached to the frame 10 ring at one end, and a cup end plate closure generally designated 12 which is attached at the other end. The three elements 10, 11 and 12 form a generally flat cylindrical capsule. Referring to FIGURE 4, the frame 10 is in the form of a ring, and is provided at one end with an axially projecting flange 14. The flange 14 is at the maximum diameter of the frame ring 10. At the minimum diameter of the frame ring 10 there is another axially projecting flange 15, which extends in a direction opposite to that shown at 14. The flange 15 then is thinned down to what is essentially a tubular extension at 16, where it continues on until it joins diaphragm 18. The diaphragm 18 separates the capsule into two sections 21 and 30.

The ring 10, flanges 14, 15, tubular section 16 and the diaphragm 18 are preferably made integral and are preferably made of a material such as stainless steel. The thickness of the tubular section 16, and its length is such that it, in effect, forms a hinge joint at 16A, at the edges of the diaphragm 18, and hence the deflections of the diaphragm are not transmitted to any noticeable degree through the "hinge" effect at 16A and through the tubular section 16 to the ring 10. In this way deflections of the diaphragm in an upward or downward direction, as shown in FIGURE 4, are not appreciably transmitted as stresses to the frame ring 10, and hence do not impair the accuracy of the instrument.

The upper end closure plate 11 is relatively thick throughout its central portions but has a thin radially projecting edge flange 11A, which has a diameter such that it terminates in contact with the end of flange 14 of ring 10. The edge of the flange 11A and the flange 14 are welded or soldered together at 19. The joint at 19 accordingly provides adequate mechanical attachment between the flange 14 and the flange 11A, as well as a hermetic seal between these elements at the joint 19.

It will be understood that under operating conditions the end closure plate 11 is provided with a tubular pressure connection 21, and with an electrical connection generally designated 22, the details of which will be more fully described. The closure plate 11, being hermetically sealed at 19 to the ring 10, forms with ring 10, tubular flange 15 and tubular section 16 and the diaphragm 18 a closed space 21, above the diaphragm 18. Accordingly, pressure appiled via the connection 21, either as a positive or negative pressure, will produce a force upon the diaphragm causing it to move either upwardly or downwardly. At the same time the enclosure plate 11 is also stressed so as to urge it to move upwardly or downwardly as shown by the double arrow 24. While the closure plate 11 is relatively massive, it will deflect to some extent, and this deflection might cause erroneous instrument actuation, were it not for the thin flange 11A, extending outwardly from the thickened central portion of the end cover 11, to the mechanical and pressure tight connection at 19. Thus when the end plate 11 is deflected one way or the other as shown by the double arrow 24, a certain bending will be induced in the plate 11 but this bending action is effectively isolated from the ring 10 by the thin flange section 11A and ring 10 is not appreciably stressed. This aids in minimizing instrument error.

The bottom closure in respect to diaphragm 18 is accomplished by the cup member or bottom closure element generally designated 12, which throughout most of its diameter is relatively thick. This cup is optionally provided with a tubular inlet connection 25, which may lead to a source of pressure, as for differential pressure actuation, or the tube 25 may be sealed off either permanently or during the course of operation by the seal-off 26. The cup closure 12 is provided with a tubular extension flange 28, which is of the same diameter as the frame ring 10, to which it is attached at the weld or solder joint 29. The thickness of the flange 28 is essentially tubular and its thickness is much less than the thickness of the main portions of the cup 12. The cup 12 which includes the flange (or tube) 28, is mechanically attached and hermetically sealed to the frame ring 10 by means of the weld or solder joint 29, and hence with the diaphragm 18 and tubular sections 16 and 15, and ring 10, form an enclosed space 30 below the diaphragm 18. When different pressures are applied via tubes 25 and tube 21, the instrument will read differential pressure. By evacuating the space 30 and sealing off the tube 25, the instrument will then read "absolute" pressure.

The cup 12 is provided with an electrical inlet connection at 31, which is the same as that at 22, for the enclosure plate 11. A grounding terminal 32A may be provided on the cup 12 or the enclosure 11 whenever convenient.

The electrical connectors 22 and 31 are preferably identical. They consist of a plug-ring 32 which is flanged and inserted in a suitable aperture 33 for the connector 31 and 34a for the connector 22. The ring 32 is soldered into the aperture in the plate 11 (or cup 12) so as to form a pressure tight connection. The ring 32 is bonded to a glass insulator 34, which in turn supports a metallic tube 35 to which an exterior electrical connection 36A (or 36B) is attached. The upper connection is designated 36A and in the lower connection 36B, since these are connected to different electrical circuits. Within the tube 35 of each connector there is an elastic electrical connection 37A (or 37B), which is soldered to the tube by means of the solder 38. Therefore, a hermetically sealed electrical connection, having a flexible lead wire 37A (or 37B) extends from the exterior of the instrument and into, respectively, the spaces 21 and 30.

Within the instrument there are provided electrical capacitance elements, the upper elements being generally designated 40 and the lower element generally designated 41. These electrical capacitance elements are similarly constructed; they are constructed so as to have the same stiffness as the diaphragm 18. Thus, the element 40 has a central metallic disk 42 having a center aperture (for machining), 42A, if desired. Around this disk there is placed a concentric ring 44 preferably of the same metal as the disk 42. The construction is shown in FIGURE 5. The disk 42 and the ring 44 are in the same plane and are coaxially arranged. The diameter of the disk 42 is such as to leave a uniform annular space 45 between the inner diameter of the ring 44 and the external diameter of the disk 42. The disk and ring are fastened together by a plurality of fused-in glass connectors 46. The construction as shown in FIGURES 4–8 can be made very conveniently by simply arranging the disk 42 and the ring 44 concentrically on a flat surface and by placing a little blob of glass at angular intervals around the space 45. Six such blobs of glass are illustrated. The assembly is then heated as in an electric furnace, and the glass melts down into the space 45 between the disk 42 and the ring 44. After cooling the disk and ring are thus mechanically fastened together, but electrically insulated from each other. Around the periphery of the ring there are attached a plurality of thin metal suspension elements 48. These are welded or otherwise attached to the ring 44. These suspension elements are strips of metal and at the upper end of each one there is formed a little dimple 48A, as shown in FIGURE 4. The construction of the capacitance disk element 41 which is under the diaphragm 18, is exactly similar except that it is slightly larger in diameter, due to the geometry of the instrument.

After the capacitance disk elements 40 and 41 have been prepared as indicated, in assembling the plate elements 40 and 41 to the unit frame and diaphragm unit 10–15–16–18, it is desirable to maintain uniform spacing at 50, between the adjacent surfaces of the capacitance plate element 40 and the upper surface of the diaphragm and a uniform space at 51 between the upper surface of the capacitance plate element 41 and the under surface of the diaphragm 18. In order to do this, while the capacitance plate element 40 (same for 41) is still detached, it is assembled in place and little spacers 52 are then introduced at several places around the space 45 between the plate 42 and the ring 44. These little spacers can be in the shape of T-shape pins which are inserted into the space 45 and then rotated to bring the T-heads 52A of the pins cross-wise into position as shown at 52A in FIGURE 5. The T-heads provide uniform spacing 50. Then with the arrangement thus temporarily held in place, the dimples 48A of the suspension elements 48 are electrically spot welded to the inner surface of the frame ring 10. The pins 52 are then rotated so as to bring the T-heads 52A lengthwise of the space 45 and are then removed and the capacitance plate element 40 is therefore mechanically supported in exact parallelism with respect to the diaphragm 18. Precisely the same procedure is followed in placing the capacitance plate element 41 which is likewise provided with a plurality of suspension elements 55 around its periphery, each of these being provided with a little dimple 55A at its upper end. With the capacitance plate element 41 temporarily assembled in place and in exact spaced relation in respect to the diaphragm 18, the dimples 55A are welded on the outer surface of the flange 15 of the ring 10.

If desired, only one capacitance plate element may be used either on the upper or lower side of the diaphragm 18.

With the elements thus in place, the lead wires 37A and 37B are soldered, respectively, to the central disk portion 42 of the capacitance plate element 40 and the central disc portion 56 of the capacitance plate element 41. The electrical connections 22 and 31 are then assembled onto the plate 11 and cup 12 respectively. At this time there is no solder 38 in place and the lead wires 37A and 37B are threaded into the tubes 35 of each connector. The rings 32 of the connectors are then soldered in place and a drop of solder is placed on the exterior of the tube 35 and capillary action fills the space between the lead wire 37A (or 37B) and the tubes 35 with solder. The rings 32 of each connector are, of course, soldered in place.

The instrument is then ready to be used. Where absolute pressure measurement is to be made, the space 30 is evacuated and the inlet 25 is sealed off, where a differential pressure is to be measured the tube 25 is connected to one source of pressure and the tube 21 connected to another source of pressure. In any event a difference of pressure will be applied to the diaphragm 18 causing it to deflect in one way or the other. The capacitance plate elements 40 and 41 remain substantially parallel and flat and accordingly as the plate 18 is deflected, it will change its capacitance with respect to the plate elements 40 and 41, which can be sensed by a suitable external measuring circuit. The change in capacitance may be calibrated in pressure units in the measuring circuit, not illustrated.

The length and coefficients of thermal expansion of the suspension elements 44 and 55 can be adjusted relative to the length of tubular flange 16, which supports the diaphragm, so that there is substantially no change of thickness dimension of spaces 50 and 51 for changes in ambient temperature. Likewise the effect of accelerative forces is nullified by making the plate assemblies 40 and 41 and the diaphragm 18 so that they all have the same resistance to bending due to acceleration forces up (or down) as shown in FIGURE 4. In this way the transducer errors due to temperature changes and acceleration forces are substantially eliminated, or at least so minimized as to have of no practical deleterious effect. Stated another way, the transducer is self-compensated in respect to temperature errors and acceleration force errors.

Referring to FIGURE 9, there is illustrated a slightly modified form of the invention wherein the diaphragm generally designated 100 is provided with integrally formed tubular extensions 101 and 102 which connect with integral rings 104 and 105. The ring 104 is provided with angular seats 106 and 107, into which the tubular extension 108 of the end closure 110 and tubular extension 109 of the closure 111 are seated and attached. By welding or soldering the elements 108 and 109 to the seats 106 and 107 respectively, a strong mechanical connection and hermetic seal is effected.

Upon the upper surface of the ring 104 there is seated and attached another ring 112 and upon the lower surface of ring 105 there is seated and attached another ring 114. Each of these rings is provided with a thin extending tubular section as at 112A for the ring 112 and 114A for the ring 114. These tubular extensions reach toward the diaphragm 100 and adjacent the diaphragm are attached to the periphery of disk-like capacitance plate elements generally designated 115 and 116 respectively. The disk elements 115 and 116 may be made of an electrically insulating material such as fused quartz, in which event an electrical capacitance plate is formed on such disks by evaporating thereon a metallic coating 115A on the under surface of the plate element 115 and on the upper surface 116A of the plate element 116. A plurality of apertures 115B and 116B are provided in the capacitance plate elements 115 and 116 respectively so as to allow pressure to be transmitted through the plate element onto the surface of the diaphragm 100. The enclosure plate 110 is provided with an electrical inlet connection 118 and the enclosure 111 is likewise provided with an electrical inlet connection 119. These can be in the form shown or of the form shown in FIGURE 4. Likewise a pressure inlet is provided at 120 for the end closure plate 110. No inlet pressure connection is shown for the end closure plate 111, but one may be provided as shown in FIGURE 4 if desired. In any event a pressure space 12 is provided between the diaphragm 100 and the end closure 110. If desired a portion of this space may be occupied by a filler such as the glass or quartz filler element 122. Where used this element 121 is attached near the periphery of the closure plate as throughout the area 124. The use of such filler element 121 reduces the volume of the pressure space and thus increases the sensitivity of the instrument for a given volumetric change of gas moving through the pressure connection 120.

The space below diaphragm 100 and end closure 111 provides a space 124 which may be evacuated or connected to another source of pressure by a pressure connection, not shown. This space 124 may likewise be provided with a filler similar to filler 122.

In the construction shown, the rings 112 and 114 are lightly attached to the frame rings 104 and 105. The thin tubular sections 108 and 109 isolate mechanical stress originating respectively in the closure plates 110 and 111 from the frame ring 104. Furthermore, the thin tubular sections 112A and 114A isolate the capacitance pressure plate element from any movements occasioned by stresses in the framing. The thin tubular sections 101 and 102 act substantially as hinge joints where they attach to the diaphragm 100 and in effect, provide a "free-edge" suspension for diaphragm 100, the pressure movements of which being substantially unrestrained by the suspension. By providing frame elements 104 and 105 in the arrangement as shown the movement of the diaphragm 100 either up or down is identical for given differential pressure changes. The diaphragm 100, and plates 115 and 116 are, where desired, made of the same stiffness so as to eliminate acceleration force errors.

The length of suspension 112A as compared to the length of 101 and the length of suspension 114A as compared to the length of 102 is exactly the same and errors due to changes in temperature are therefore eliminated or at least so minimized as to be of no consequence.

If desired, two capacitance plate elements of the type shown at 40–48 in FIGURE 4 may be utilized in place of the capacitance plate elements 115 and 116 illustrated in FIGURE 9. In such event, attachment of the suspensions 48 for the FIGURE 4 type capacitance plate element 40 is made by welding the dimples 48A of suspension 48 to the internal diameter surfaces of the rings 104 and 105.

FIGURE 10 illustrates a further embodiment of the invention wherein the instrument utilizes an outer pressure tight cylindrical case which will withstand a high case-pressure. In FIGURE 10 the case is composed of a cup generally designated 140 and a cover generally designated 141 which are so machined that the peripheral surface 142 of the cover seats on the ledge 144 of the cup. The cup and cover are hermetically sealed at weld 145. A pressure inlet tube 146 is hermetically sealed to the cover 141 and has a screen filter at 147 and the cover has a hermetically sealed electrical inlet at 148 for inlet wire 149. Inlet tube 150 is attached in pressure-tight relation to the cup 140 and is provided with filter 151 and a hermetically sealed electrical inlet 152 is provided for connection wire 154 which leads into the cup.

The cover has a flange 155 which is machined so as to provide a seat 156 in which flange 158 of the stress isolating ring generally designated 157 is adapted to be seated. The flange 158 of the stress isolating ring 157 is mechanically attached and hermetically sealed to cover 141 at seat 156 by welding, furnace brazing or soldering, not shown. The stress isolating ring 157 has a cylindrical section 159 extending to slightly thickened terminal edge 160.

Within the cup there is a massive frame ring 161 which, as compared to other elements within the cup-cover container, is of great strength and thickness. Ring 161 is shouldered at 162 to receive the edge 160, which is mechanically attached and hermetically sealed at weld 153. The ring 161 is thinned down at flange 164 so as to provide attaching surface 163 and then thinned out to the cylindrical surface (or flange, however designated) at section 165, which continues and is integrally attached to the periphery of the diaphragm 166. The section 165 is thin and not only provides a substantially free-edge support and attachment for diaphragm 166, but effectively isolates the bending forces of the diaphragm from the ring 161. Above the diaphragm 166, as shown in FIGURE 10 in the sealed space 172, there is positioned a capacitance plate assembly generally designated 170 having suspension and support elements 171 having dimples 171A spot welded to surface 163 so as to hold the plate assembly 170 parallel to the diaphragm 166 with a uniform space at 177. Similarly, below the diaphragm 166, as shown in FIGURE 10, in the sealed space 174, there is positioned a capacitance plate assembly generally designated 167 having suspension and support elements 168 having dimples 168A spot welded to surface 180 on the inside of ring 161 so as to hold the plate assembly 167 parallel to diaphragm 166 with a uniform space at 178. Wire 149 is soldered at 175 to the insulated center plate portion 170A and the wire 154 is soldered at 176 to the insulated center plate portion 167A.

Both plate assemblies 167 and 170 are constructed like elements 40 and 41 of FIGURE 4, or elements 115 and 116 of FIGURE 9. That is to say the central plate elements (170A and 167A) are supported in insulated relation concentrically in support rings (170B and 167B), to which the suspension and support elements (171 and 168) are attached, the insulations being the fused-in glass heads (170C and 167C). It will thus be seen that the ring 161 has the same pressure applied to its outer surface 179 and its inner surface 180 and end surface 181. The ring is massive and is thus substantially free from those stresses originating due to the pressures applied to the diaphragm 166 of the instrument. Also deflections in the case 140–140 do not impose stresses on the ring 161 because, even though case (cup 140 and cover 141) is mechanically attached and hermetically sealed to the ring 161 and attendant parts 164–166, the ring 161 and case are effectively isolated in respect to stress transmission by the isolating ring 157 which is thinner and composed of right angularly oriented flanges 158–159. Likewise, as noted, diaphragm deflections are isolated by thin section 165 and the diaphragm is (substantially) in a free-edge support relation due to section 165. The suspension-attachments 168 and 171 attach to the ring 161 and the capacitance plate elements 170 and 171 are hence held parallel to the position of the (undeflected) diaphragm 166, even though large differential pressures are imposed on pipes 146 and 150.

In any of the exemplary devices herein described, capacitance plate element may be used on one side of the diaphragm rather than two such elements as shown. The two element devices are desirable for some indicator circuits, whereas one is desirable in other circuits.

As many apparently widely different embodiments of this invention may be made without departing from the spirit and scope thereof, it is to be understood that we do not limit ourselves to the specific embodiments disclosed herein.

What we claim is:

1. An electrical pressure gauge comprising a ring, end caps attached to the ring and closing the ring to form a casing, a diaphragm extending across and fastened to the ring for separating it into two compartments, pressure connection means extending into at least one of said compartments, a plate supported on the casing in at least one compartment and being parallel to, closely spaced from and insulated from the diaphragm, separate electrical connection means on the plate and diaphragm, the diaphragm being a circular disc, the connection between the diaphragm and ring being an annular wall extending from adjacent the peripheral edge of the diaphragm to the ring and attached to the ring, said wall being substantially thinner than the diaphragm, said ring being massive as compared with the diaphragm.

2. A pressure sensitive capacitative electrical transducer comprising a pressure responsive diaphragm and a capacitance elements, said diaphragm and element each being circular, means attached to the peripheral edges of the diaphragm and to the peripheral edges of the capacitance element mounting them with one electrically insulated from the other and substantially parallel to each other and spaced apart, said diaphragm and capacitance element together forming an electrical capacitor, said diaphragm and capacitance element together with their respective mounting means having substantially equal rigidity in axial direction, and closures forming a closed spaced covering each face of the diaphragm, and pressure inlet means into at least one of said spaces.

3. The transducer specified in claim 2 further characterized in that a capacitance element is provided on each side of said diaphragm, one in each enclosure and each has substantially equal rigidity in axial direction.

4. The transducer specified in claim 2 further characterized in that the closures include a strong frame ring positioned coaxially around the diaphragm, the edge of the diaphragm being connected in pressure tight relationship to the ring by means of a section which is much thinner than the diaphragm and the ring.

5. The transducer specified in claim 2 further characterized in that the closures include a strong ring positioned coaxially around the diaphragm, said ring being connected to the diaphragm in pressure tight relationship by means of a thin tubular flange section extending axially from the edge of the diaphragm to the ring and forming a closure therewith, said capacitance element being supported from said ring by a plurality of suspension elements connecting the ring and the edge of the capacitance element, said suspension elements extending generally parallel to the axis of the diaphragm.

6. A pressure operated transducer of the capacitance type comprising a frame ring, a closure plate extending across and connected to the ring at at least one end, said plate being thin where it is connected to the ring so as to minimize transmission of stress from the plate to the ring, a short tube hermetically attached to the ring and extending axially in respect to the ring axis, a diaphragm extending across the tube and hermetically attached adjacent its peripheral edges to the tube so as to close it, said diaphragm being much thicker than the wall of the short tube, said plate, ring, tube and diaphragm forming a closed chamber, said chamber being provided with an opening thereinto, a disc-shape capacitance plate element having an electrically conductive surface electrically insulated in respect to the ring and supported in a position substantially parallel to and spaced from the diaphragm, said plate element being supported from the ring by a plurality of stays extending from the edge thereof and generally parallel to the diaphragm axis and connected to the ring the center portions of the diaphragm and the disc shaped plate element forming the capacitor transducer.

7. The transducer specified in claim 6 further characterized in that the short tube and stays are composed of material having coefficient of thermal expansion and being of length such that their axial expansion does not differ sufficiently to significantly vary the spacing between the disc element and the diaphragm.

8. The transducer specified in claim 6 further characterized in that two disc-shaped capacitance plate elements are provided, one on each side of the diaphragm.

9. The transducer specified in claim 6 further characterized in that a second closure is provided on the opposite end of the ring from the plate, said second closure being connected hermetically to the ring by means of a thin-walled section so as to minimize transmission to the ring of stresses originating in the second closure.

10. A pressure operated transducer of the capacitative type comprising a frame ring, plates connected in pressure tight relation across each end of the ring, and forming an enclosure therewith, a pressure connection through at least one of the plates, a diaphragm positioned between the plates and connected to the ring by a thin tubular wall so as to divide the enclosure into two compartments, capacitor plate means in at least one compartment comprising an annular support ring connected to the frame ring, a capacitance plate arranged coaxially in respect to the support ring and positioned in the plane of the support ring, said capacitance plate being of a diameter so as to be spaced from the support ring, and a plurality of spaced apart rigid insulators bridging said space and fused to the support ring and capacitance plate and forming the support ring and capacitance plate into a unitary whole, and an electrical connection through the enclosure from the capacitance plate to the exterior of the enclosure.

11. A pressure operated transducer of the capacitance type comprising a frame ring, a closure plate extending across and connected to the ring, said plate being connected to the ring by a thin peripheral flange that is thinner than the plate and thinner than the ring so as to minimize transmission of stress from the plate to the ring, an annular support wall section that is thinner than and of smaller diameter than the ring hermetically attached to the ring, a diaphragm hermetically connected at its outer peripheral edges to the support section, said diaphragm being much thicker than the support section, said plate, flange ring, support wall section and diaphragm forming a first closed chamber, said chamber being provided with an opening thereinto, a disc-shaped capacitance plate element having an electrically conductive surface supported in said closed chamber in electrically insulated relation in respect to the ring and supported in a position substantially parallel to and slightly spaced from the diaphragm, said plate element being supported from the ring, an enclosure member outside the diaphragm and hermetically connected to the ring and forming a second closed chamber with the ring, support section and diaphragm, and an inlet into said second chamber, the distance between the diaphragm and the plate element being substantially less than the distance from the respective opposite face surfaces of the diaphragm and the plate element to its adjacent enclosure member.

12. The transducer of claim 11 wherein the plate element is attached to an annular support ring which is co-planar with the plate element, the plate element being spaced from the support ring except at points of attachment thereto, said plate element being attached to the support ring with a plurality of separated quantities of rigid insulators fused to the plate element and support ring.

References Cited by the Examiner

UNITED STATES PATENTS

| | | | |
|---|---|---|---|
| 2,271,983 | 2/42 | La Rue | 317—247 X |
| 2,401,527 | 6/46 | Vance | 317—246 |
| 2,753,515 | 7/56 | Rickner | 317—246 |
| 2,808,545 | 10/57 | Hirtreiter | 317—246 |
| 2,958,056 | 10/60 | Di Giovanni | 317—246 X |
| 3,000,215 | 9/61 | Atanasoff et al. | 73—398 |

LARAMIE E. ASKIN, *Primary Examiner.*

WALTER L. CARLSON, JOHN P. WILDMAN, JOHN F. BURNS, *Examiners.*